Fig. 1a.

INVENTOR.
David P. Fitzsimmons
BY W. L. Stout
HIS ATTORNEY

June 19, 1956 D. P. FITZSIMMONS 2,751,492
RAILWAY CAR SPEED DETERMINING AND CONTROL APPARATUS
Filed April 23, 1952 2 Sheets-Sheet 2

Fig. 1b.

INVENTOR.
David P. Fitzsimmons
BY
W. L. Stout.
HIS ATTORNEY

United States Patent Office 2,751,492
Patented June 19, 1956

2,751,492

RAILWAY CAR SPEED DETERMINING AND CONTROL APPARATUS

David P. Fitzsimmons, Trafford, Pa., assignor to Westinghouse Air Brake Company, Wilmerding, Pa., a corporation of Pennsylvania Application April 23, 1952, Serial No. 283,931

19 Claims. (Cl. 246—182)

My invention relates to railway car speed determining and control apparatus and particularly to apparatus for repeatedly determining the speed of a railway car and establishing a control in accordance to the speed. More specifically, the invention is directed to a speed control apparatus for car retarders.

There are many places in railway signaling systems where it is desirable to determine the speed of a railway car and set up a control according to the speed. For example, in classification yards using humps and where car retarders are provided for controlling the cuts of cars or car units as they approach the yard tracks into which the cars are being classified, it is desirable to control the retarders according to the speed of the cars. Obviously, there is a correct speed at which a car unit should drift into the selected track and couple to the cars already standing on the track without too great an impact. To this end, the degree of braking force exerted by a car retarder must be varied as the car unit progresses through the retarder so that it will leave the retarder at a speed correct for that individual car unit. Generally, the movement of the braking bars of a retarder is electrically controlled by an operator located in a tower where he can observe the car units and govern the braking force to be exerted by the retarder according to the speed at which the car unit in his judgment is moving as it approaches and moves through the retarder and in this way have each car unit leave the retarder at the desired speed. In these hump yards the cars move from the hump under the influence of gravity and the speed of the individual car units varies depending among other things on the speed at which it is pushed over the hump, the weight of each car and its contents, the temperature and whether or not the car is in a free running condition. These circumstances make it difficult for an operator to properly determine the braking force in order to have a car unit leave the retarder at the desired speed.

It has been proposed to govern the braking force of car retarders automatically according to the speed at which the car is moving through the retarder and thereby remove the errors that may arise by an operator wrongly judging the car speed and the running condition of the car. In these automatic systems it is a problem to provide means for progressively determining the speed of a car unit as it moves through the retarder and thereby provide means for automatically controlling the retarder.

Accordingly, an object of my invention is the provision of novel and improved means for automatically controlling the braking action of a car retarder in accordance with the speed of a car unit.

A further object of my invention is the provision of improved circuit apparatus for repeatedly determining the speed of a car passing through a stretch of track and establishing a control according to the determined speed.

Again, an object of my invention is the provision of railway car speed determining means incorporating novel means for passing the control successively from one pair of car wheels to the next pair of wheels in the rear until the car has completely passed out of a given stretch. Also, means is provided for automatic cancellation of erroneous speed measurements due to the multiplicity of car wheels passing through the stretch.

A still further object of my invention is the provision of improved speed determining track circuit apparatus for a series of insulated track sections, and which apparatus is substantially immune to failure due to crosses and grounds on the circuits and also to failure due to a momentary loss of car shunt and at the same time provide suitable shunting sensitivity.

A feature of my invention is the provision of speed determining track circuit apparatus for use at a car retarder and incorporating improved means whereby a loss of control due to the so-called squeezing action of the retarder lifting the car wheels off the track rails is avoided by opening the retarder to drop the car wheels back on the track rails and the control regained.

Another feature of my invention is the provision of car retarder speed control apparatus incorporating novel means for holding the retarder open or at its nonbraking position when a car stalls or is moving very slowly.

Again, a feature of the invention is the provision of speed determining track circuit apparatus for a series of short track sections incorporating a novel normal resetting circuit arrangement for the track relays and including a novel emergency reset circuit means for the track relays in the event the normal reset circuit arrangement fails.

Again, a feature of the invention is the provision of speed determining track circuit apparatus of the type here involved incorporating a novel searching circuit means to determine if the track circuits to the rear are occupied when any pair of car wheels pass out of the retarder.

Other objects, features and advantages of my invention will appear as the specification progresses.

According to my invention, a stretch of track over which traffic normally moves in a given direction is formed with track sections. Preferably, these track sections are formed by one rail being insulated by the usual insulated rail joints and the other rail being electrically continuous and common to all the track sections. Each of these track sections is included in a single rail, normally energized track circuit which comprises a holding circuit, a shunting circuit and a reset or pickup circuit. All the track circuits except the one for the leaving section are energized from a common direct current source. Each track relay is normally energized through its own front contact and a front contact of all the following track relays except the track relay for the leaving or last track circuit. That is to say, the normal holding circuit for each track relay branches off the original holding circuit from the positive terminal of the power source through its own front contact and winding and returns to the negative terminal of the source through a suitable individual current limiting resistor. The shunting circuit is formed for each track circuit by a connection from the positive terminal of the corresponding source to the common rail and thence through a pair of car wheels to the insulated rail of the corresponding section and to the junction terminal of the track relay winding with the individual resistor. The reset circuit means includes a back contact of the last section relay and a front contact of the other track relays in their ascending order. The track circuit for the last or leaving track section is a normally energized, single rail circuit which is provided with its own track battery or source and is energized or deenergized in accordance with whether or not the section is shunted by a pair of car wheels.

Each of these insulated rail sections is relatively short and of a length such that no two pairs of car wheels and axles can overlap in the occupancy of any one track circuit. Also, the sections are preferably of the same length.

By the holding, shunting and reset circuits of each track circuit, the shunting control is passed from the leading pair of car wheels to the next pair in the rear progressively until the last pair of wheels of a car pass beyond the leaving track section.

A suitable time measuring means is controlled by these track relays in such a manner as to initiate a new timing period as each track relay is shunted by a car passing through the sections. Hence, this time measuring means provides a time period which is the measure of the speed of the car in passing through the track section, the occupancy of which initiated the operation of the time measuring means. Control relays governed by the time measuring means are provided for establishing a control according to the extent it is moved during the occupancy of a section. When used with a car retarder, the leading pair of wheels and axle of a car unit passing through the track sections has control of the time measuring means until the leading pair of wheels pass off the last section at which time the track relays are reset and the next pair of car wheels to the rear take over control of the track relays and thus of the time measuring means. This operation is repeated for the successive pairs of car wheels until the car has completely passed beyond the track sections. When a pair of car wheels pass off the leaving track circuit and the next pair of wheels to the rear take over control, this pair of wheels may have passed part way through the section occupied and thereby the timing mechanism will indicate a car speed greater than the actual speed due to the short length that the car wheels move during the operation of the time measuring means. This wrong speed measuring will effect a wrong control. According to my invention the speed measuring operation by the time measuring means is not made effective until the pair of wheels to the rear which have taken over control enter the next track section. This delay in the speed measuring control is accomplished by providing an odd and an even cancellation relay which are associated with alternate track relays in such a manner that the initiating of an effective timing period by the time measuring means is delayed when a given control has been requested or a pair of wheels is passing over the leaving track section.

When this control apparatus is used for a car retarder the arrangement of the apparatus provides that when the so-called squeezing action of the retarder lifts the car wheels off the track rails and, if no action is taken, the wheels run on the braking bars of the retarder and not under the control of the retarder, the lifting of the car wheels off the rails indicates that the car is going too slow and the retarder is released and opened allowing the wheels to drop back on the track rails and the control regained.

I shall describe one form of apparatus embodying my invention and shall then point out the novel features thereof in claims.

In the accompanying drawings, Figs. 1a and 1b when placed side by side with Fig. 1a at the left are a schematic view showing one form of apparatus embodying my invention when used with a car retarder.

It is to be understood the invention is not limited to use with car retarders and this use is by way of illustration and there are other places where the apparatus is useful.

Figure 1A:
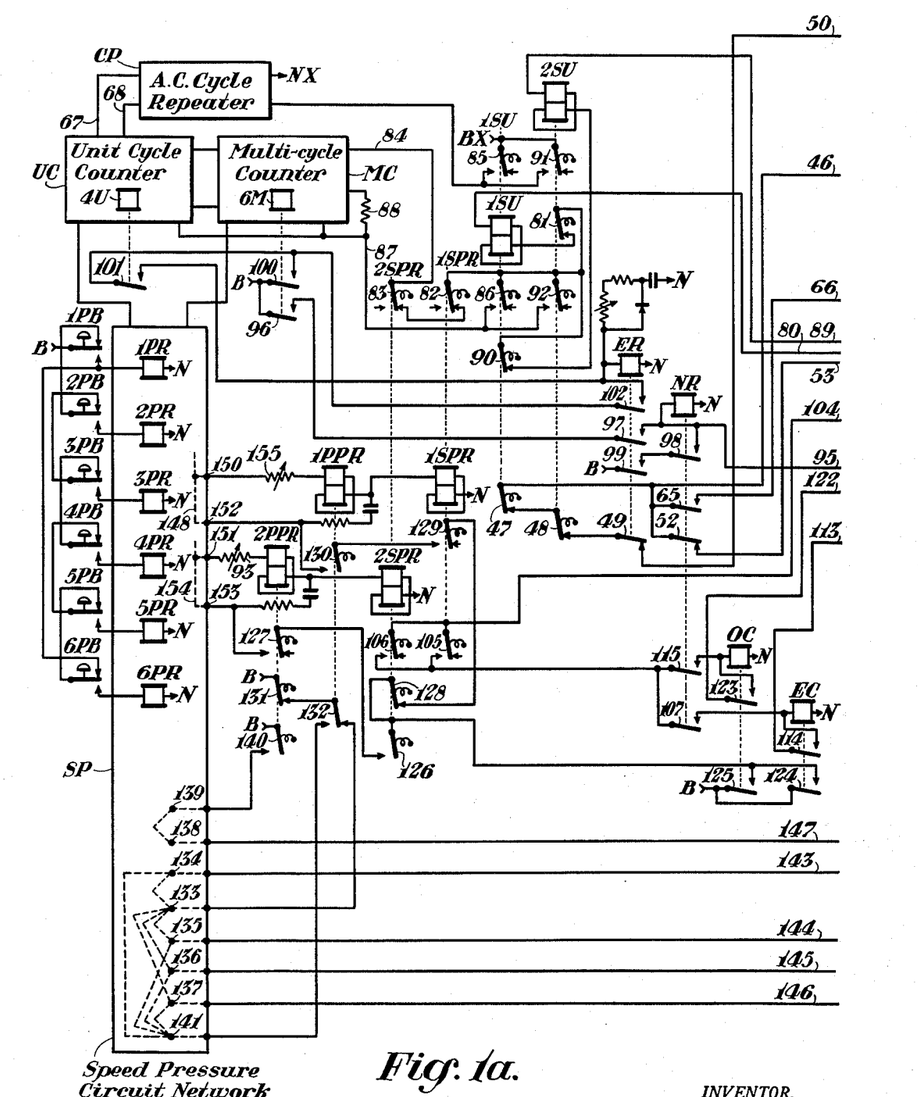
Figure 1B:
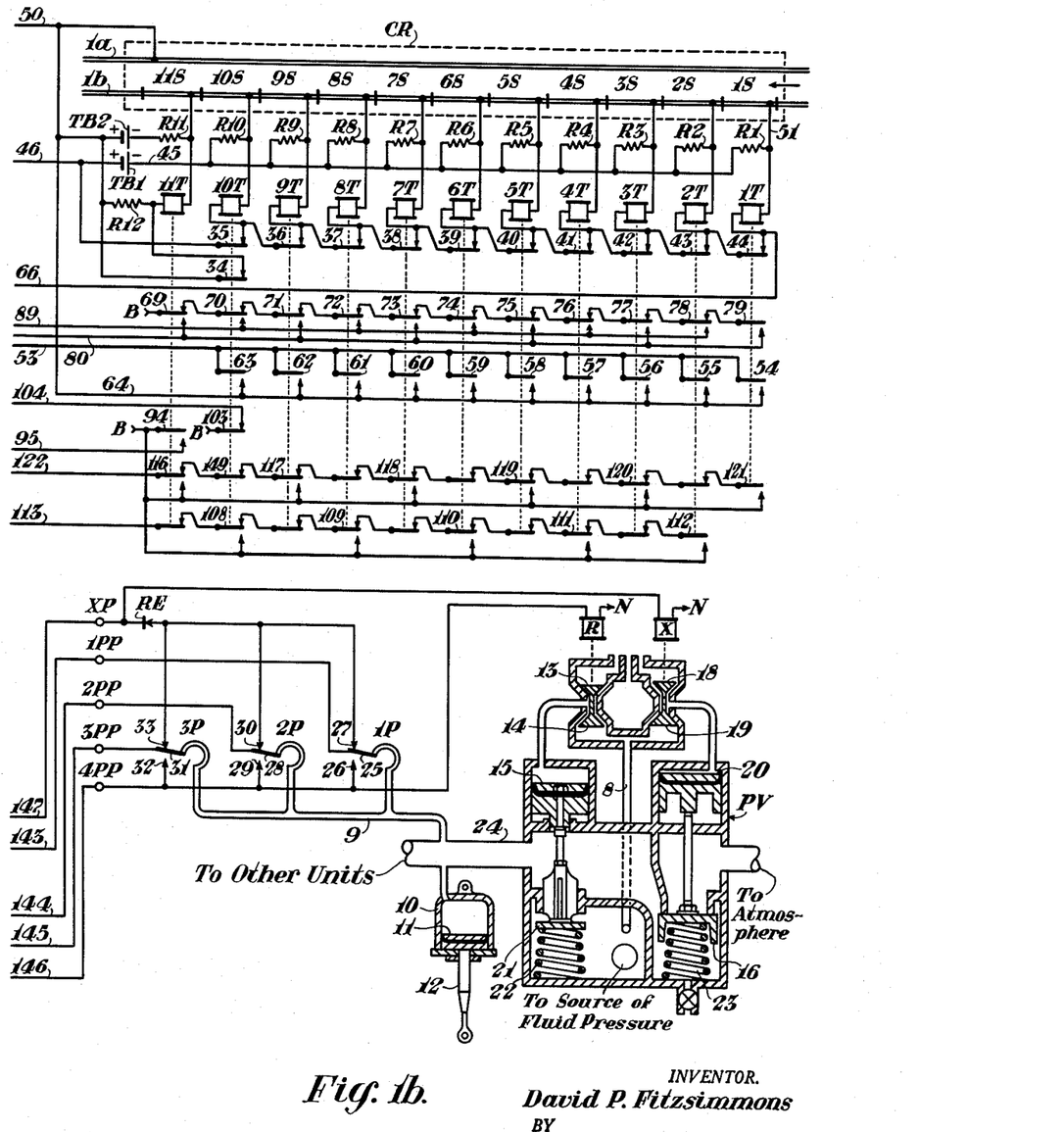

Referring to the drawings, the reference characters 1a and 1b designate the rails of a stretch of railway track over which traffic normally moves in the direction indicated by an arrow and under conditions such that it is desirable to at times determine the speed of a vehicle or car and automatically establish a control according to the measured speed. For example, as here shown, this track is that leading from a hump to the yard tracks of a classification yard, the cars moving under the influence of gravity and it is desirable to control the speed of the car as it enters the selected classification track.

In order to control the speed of a car unit, the stretch of track illustrated in the drawing is provided with a car retarder CR. This retarder CR may be any standard type known to the art and since its specific structure forms no part of my invention it is indicated conventionally by a dotted rectangle. It is sufficient for the present application to point out that this retarder is provided with braking bars located on the opposite sides of each of the track rails 1a and 1b and operatively connected to motors for movement toward the rails for frictionally engaging the sides of the wheels of a car moving through the stretch of track to provide a braking force, the braking bars being also movable away from the rails to a position where they disengage the car wheels and provide no braking action. That is, these braking bars are movable to a so-called closed position where they brake the car wheels and to a so-called open position where they are disengaged from the car wheels. Furthermore, a motor means is provided for applying different forces to the braking bars and thereby vary the braking force exerted. For example, this car retarder may be similar to the widely used electropneumatic mechanism disclosed in Letters Patent of the United States No. 1,927,201, granted September 19, 1933, to Herbert L. Bone, for Railway Braking Apparatus. In this retarder the braking bars are moved by a plurality of independently operated units each of which has a fluid pressure motor comprising a cylinder provided with a piston connected to the braking bars by a suitable linkage. The linkage and braking bars are spring biased to a nonbraking or open position and movable to a braking or closed position by pressure admitted to the cylinder. Pressure to the cylinder of each unit is supplied to and exhausted from the cylinder by a control valve governed by two magnet valves.

In the drawing of the present application only the portion of this car retarder mechanism sufficient for a full understanding of my invention is shown for the sake of simplicity, reference being made to the aforementioned H. L. Bone Patent No. 1,927,201 for a complete showing of a car retarder mechanism of the type here contemplated. In Fig. 1b a cylinder 10 is that of one of the independent operating units of the car retarder, each operating unit of the retarder having a similar cylinder. The cylinder 10 contains a piston 11 attached to a piston rod 12, the outer end of which is adaptable of being connected to the braking bars by a suitable linkage not shown. When the piston 11 occupies its upper position as viewed in the drawings, the braking bars are biased to their nonbraking position. When fluid pressure is admitted to the cylinder 10 above the piston 11, the piston is forced downward and the braking bars are moved to their braking or closed position, the braking force exerted by the bars being determined by the pressure of the actuating fluid which is ordinarily compressed air with a normal pressure of the order of 100 pounds per square inch. The supply of fluid pressure to the cylinder 10 is controlled by a control valve PV which is governed by two magnet valves X and R. Normally, that is, when no car is passing through retarder CR, the retarder is held closed by full pressure of the source. This normal condition is effected by the magnet R being energized and the magnet X being deenergized. With the magnet R energized, a valve 13 actuated thereby is forced downward to close the valve. Also, a valve 14 is forced downward to an open position. With valve 14 open, pressure from the source is admitted through a port 8 to the chamber above a piston 15 of a pneumatic control valve PV forcing the piston 15 downward against the force of a spring 22 to open a control valve 21. With control valve 21 open pressure is admitted from the source to pipe 24 leading to cylinder 10 with the result the full pressure of the source is applied to the cylinders of the retarder operating units. Also, with magnet X deenergized, a valve 18 is moved upward to an open position and a valve 19 to a closed position. With valve 18 open, the chamber above a piston 20 of the control valve PV is exhausted to atmosphere and a valve 16 is closed by a bias spring 23 and the exhaust port of the pipe 24 is blanked.

When the magnet X is energized and the magnet R is deenergized, the car retarder is operated to its open or release position. With magnet X energized, the valves 18 and 19 are forced downward to close the valve 18 and open the valve 19. Under this condition pressure from the source is admitted through port 8 to the chamber above piston 20 and the control valve 16 is open to exhaust the cylinder 10 to atmosphere. With magnet R deenergized, then its valve 13 is open and its valve 14 seated so that the chamber above piston 15 is exhausted with the result the control valve 21 is closed and the supply of pressure from the source to cylinder 10 is shut off.

The magnets R and X are controlled in part by pressure responsive devices 1P, 2P and 3P, each of which comprises a Bourdon tube connected by a pipe 9 to the pipe 24 by which pressure is supplied to cylinder 10. Each Bourdon tube actuates a contact member between a first and a second position. For example, the tube 1P actuates a contact member 25 between a first position where it engages a stationary contact 26 and a second position where it engages a stationary contact 27. Similarly, the tube 2P actuates a contact member 28 between a first position where it engages a contact 29 and a second position where it engages a contact 30, and the tube 3P actuates a contact member 31 between a first position where it engages a contact 32 and a second position where it engages a contact 33.

These pressure regulating tubes are so constructed and adjusted that they operate successively as the pressure in the cylinder 10 increases. For example, for all pressures below 25 pounds per square inch the first position contact of each of the pressure tubes is closed. If the pressure exceeds 25 pounds per square inch, the contact 25—26 of the tube 1P opens and if the pressure exceeds 35 pounds per square inch the contact 25—27 of the tube 1P is closed. Similarly, the first position contact 28—29 of the tube 2P opens when the pressure exceeds 50 pounds per square inch and the second position contact 28—30 of the tube 2P is closed when the pressure exceeds 60 pounds per square inch. Also, the first position contact 31—32 of the tube 3P opens when the pressure exceeds 75 pounds and the second position contact 31—33 is closed when the pressure exceeds 85 pounds.

It is to be seen that when positive energy is applied to a terminal XP of the car retarder, the magnet X is energized and the magnet R is deenergized and the car retarder is actuated to the nonbraking position. When positive energy is removed from the terminal XP and applied to a terminal 1PP the magnet X is deenergized and magnet R is energized through contact 25—26 of tube 1P and 100 pound pressure is admitted to the cylinder 10 of the car retarder operating unit. When the pressure builds up to and exceeds 25 pounds per square inch, the contact 25—26 of tube 1P opens and the magnet R is deenergized, with this pressure of 25 pounds retained in the cylinder 10. If the pressure in the cylinder 10 exceeds 35 pounds, then the contact 25—27 of tube 1P is closed so that the magnet X is energized by the positive energy on terminal 1PP through a half wave rectifier element RE and the control valve PV is actuated to exhaust the pressure in the cylinder 10 until it is reduced to substantially 25 pounds when the contact 25—27 again opens and magnet X is deenergized. On the other hand, if the pressure in the cylinder 10 falls below 25 pounds then the contact 25—26 is reclosed to energize the magnet R and thereby open the valve 21 of the control valve PV and reapply pressure to the cylinder 10 to build up the pressure.

In a similar manner, when energy is applied to the terminal 2PP of the car retarder control, the magnet R is energized through contact 28—29 of the tube 2P and magnet X is eenrgized through the contact 28—30 of the tube 2P and the rectifier element RE and thereby the pressure in the cylinder 10 is maintained between the pressures of 50 and 60 pounds per square inch. Likewise, when positive energy is applied to the terminal 3PP the magnets R and X are controlled through contacts 31—32 and 31—33 of the tube 3P to control the pressure in the cylinder 10 between 75 and 85 pounds. Furthermore, when positive energy is applied to terminal 4PP, then the magnet R is energized directly and the full 100 pond pressure of the supply source is applied to the cylinder 10 of the car retarder operating unit, as stated above, this condition being the normal condition of the retarder.

It follows from the foregoing that there are four different control conditions that can be set up for the retarder. It is to be understood, however, that my invention is not limited to this control arrangement of the retarder and additional pressure conditions can be provided or a less number of pressure conditions can be used.

In manual control systems of car retarders, positive energy is selectively applied to the car retarder control terminals through different positions of a manually operable lever having a position for each control condition. When the retarder is to be controlled automatically by apparatus embodying my invention, this manual control is disconnected and positive energy is selectively applied to the retarder control terminals through speed determining apparatus of the invention. In the drawing the manual control is not shown for the sake of simplicity and only the automatic control set up by the speed of the car is shown.

To determine the speed of a car through the retarder CR, track rails 1a and 1b within the car retarder CR are formed with a series of short insulated sections 1S to 11S, inclusive, the rail 1b being formed into sections by the usual insulated rail joints and the rail 1a being electrically continuous and common to all of the track sections. While this series of sections shown includes 11 track sections, the invention is not limited to this number of track sections and a fewer or a greater number of sections can be used. These sections are preferably of the same length and extend substantially from the entrance end of the car retarder to the leaving end thereof. In a preferred arrangement each track section is 3 feet 1½ inches in length, this length being selected because it agrees with the structure of the car retarder here contemplated and it also assures that for all ordinary spacing of the successive pairs of wheels of railway cars no two pairs of wheels can occupy a single section simultaneously. Furthermore, the 11 sections provide a total length that is suitable for a common arrangement of car retarder.

Each of these track sections is provided with a normally closed track circuit which includes a direct current track relay reference T plus a numeral corresponding to the section, and a direct current source, such as a track battery. Preferably, all the track circuits except that for leaving section 11S are supplied from a single source of direct current, here shown as a track battery TB1. The leaving section 11S is provided with an individual track battery TB2.

Each track circuit includes, except for the last section 11S, a holding or stick circuit, a shunting circuit and a reset or pickup circuit. These circuits are similar for each track circuit. For example, the track relay 1T for the track circuit of section 1S is normally energized by a holding circuit that extends in series from the positive terminal of the track battery TB1, through front contacts 35 to 44, inclusive, of the track relays 10T to 1T, inclusive, winding of the relay 1T and an individual current limiting resistor R1 and wire 45 to the negative terminal of the battery TB1. Similarly, the individual holding circuit for each of the track relays 2T to 10T branches off this original holding circuit at the front contact of the relay and extends through the winding of the relay and thence through an individual current limiting resistor of the series of resistors R2 to R10, inclusive, and wire 45 to the negative terminal of the battery. Thus, each track relay 1T to 10T is normally energized through its own front contact and a front contact of all the following track relays of the series in sequence.

The shunting circuit for each track circuit of sections 1S to 10S includes a connection from the positive terminal of the battery TB1 to the common rail 1a through two branch paths, the first one of which includes contacts of certain control relays to be referred to hereinafter. For example, the first branch of a shunting circuit of the track relay 1T extends from battery TB1 through wire 46, reverse contacts 47 and 48 of relays 1SU and 2SU, respectively, back contact 49 of a relay ER, and wire 50 to common rail 1a. The shunting circuit for relay 1T is completed from rail 1a through a pair of car wheels and axle to rail 1b of section 1S and wire 51 to the junction terminal of the winding of relay 1T and resistor R1. Similarly, the first branch of the shunting circuit for each of the track relays 2T to 10T is completed to the rail 1a as previously described and then the shunting circuit extends through a pair of car wheels and axle to the rail 1b of the respective track section and to the junction terminal of the relay winding and the individual resistor. The second branch of the shunting circuit for the relay winding 1T extends from the positive terminal of battery TB1 through wire 46, back contact 52 of a relay NR, wire 53, back contacts 54 to 63, inclusive, in multiple of relays 1T to 10T, respectively, and wires 64 and 50 to the common rail 1a and thence by a car shunt to the insulated rail 1b. The parts are proportioned for each track relay 1T to 10T to be normally supplied with a suitable working value of current, the current for each relay being adjustable by the individual resistor interposed in the holding circuit. Also, the parts are so proportioned that a suitable shunting sensitivity for each track relay is obtained.

The reset or pickup circuit for the track circuits is arranged so as to pick up the relays 1T to 10T in cascade, beginning with the relay 1T. The reset circuit for the relay 1T, for example, extends from positive terminal of battery TB1 through wire 46, front contact 65 of relay NR, wire 66, winding of relay 1T, resistor R1 and wire 45 to the negative terminal of the battery. Branching from this original reset circuit, the reset circuit for the relay 2T extends over front contact 44 of relay 1T, winding of relay 2T and resistor R2 and wire 45 to the negative terminal of the battery. The reset circuit for each of the other track relays branches off the original reset circuit through a front contact of each track relay to the rear as will be apparent from an inspection of the drawing. It is clear, therefore, that this cascade pickup arrangement for the track relays assures that no relay in the group can pick up until all relays in the rear of it are picked up.

The track circuit for the last or leaving section 11S is a normally closed circuit similar to those provided for the other sections except it is provided with its own track battery TB2 and is responsive to occupancy of the section 11S only. The track relay 11T of section 11S is normally energized by a holding circuit that includes battery TB2, a resistor R12, winding of relay 11T and a resistor R11, the resistor R12 being normally by-passed by a front contact 34 of track relay 10T. A shunting circuit for the relay 11T extends from positive terminal of battery TB2 over wires 64 and 50 to the track rail 1a and thence through the shunt formed by a pair of car wheels to rail 1b of section 11S and to the junction terminal of the resistor R11 and the relay winding. It is clear that the track relay 11T is provided with operating characteristics similar to those provided for the other track relays except it is controlled only by occupancy of the section 11S. The resistor R12 and the by-pass path through the front contact 34 of track relay 10T assures that the leakage resistance for the track section 11S at which the track relay 11T fails is substantially the same for both the picking up of the relay 11T and the release of the relay.

These track relays are used to control a time measuring means by which the speed at which a pair of car wheels move through an individual track section is determined by measuring the time consumed by the pair of car wheels moving through the section. This time measuring means may take different forms and its specific structure forms no part of my invention, there being several such time measuring means known to the art. As here shown, this time measuring means is an alternating current cycle counting device and comprises a source of alternating current of a selected frequency, an alternating current cycle repeater CP, a unit cycle counter UC and a multiple cycle counter MC. Preferably this time measuring means is similar to that disclosed and described in Letters Patent of the United States No. 2,320,802, granted June 1, 1943, to Clarence S. Snavely, for Railway Braking Apparatus. Reference is made to that patent for a complete description of such time measuring means which is described here only to the extent necessary for a full understanding of my invention.

The alternating current source may be the usual 60 cycle commercial supply, the terminals of which source are indicated by the reference characters BX and NX. It is to be understood, of course, that alternating current of other frequencies can be used.

The alternating current cycle repeater CP includes quick acting relays and rectifiers, the relays being operable to alternately close contacts in step with the cycles of the alternating current. That is, each contact of a pair of contacts is closed $1/60$ of a second or $16\frac{2}{3}$ milliseconds and is then open for a like period.

The unit cycle counter UC includes a chain of six quick acting relays, the relay 4U of the chain being the only one shown. This relay chain is connected to the cycle repeater by wires 67 and 68 and the relays are interconnected in such a manner that the chain serves to count the operation of the cycle repeater. The action of this chain is advanced by one relay each cycle of the alternating current and thus the particular relay that is operated at any given time gives a direct measure of the lapsed time from the beginning of the operation. Circuit connections are provided so that when the count of six is exceeded the chain doubles back and continues to count over and over again. The complete operation is here considered as seven operations of the chain UC. Thus each operation of the unit chain UC represents a time period of .1 second or 100 milliseconds, and the seven complete operations represent a total time period of .7 second.

The multiple cycle counter MC includes a chain of six counting relays of which only the final relay 6M is shown in the drawing. This multiple counting chain is connected to the unit cycle counter UC in such a manner as to progressively pick up the relays one each time the unit chain completes a round trip operation. Thus the six relays of the multiple chain are all picked up in response to six operations of the chain UC and measure the time interval of .6 second or 600 milliseconds. It is obvious that the particular relays of the unit chain UC and the multiple chain MC which are picked up at any time are a measure of the time that any track section which is then functioning as a measuring section has been occupied within the limit of the time measuring means. For example, if the relays 6M and 6U are picked up while a pair of car wheels are moving through the 3 feet 1½ inches of a track section, the average speed of the car is approximately 3.1 miles per hour.

Correspondingly, if the unit chain makes only one operation and the relay 1M of the multiple chain is picked up while the car is moving through the track section and consumes only .1 second, the average speed of the car is approximately 21.3 miles per hour. It is to be seen, therefore, that this time measuring means is capable of measuring a range of speeds from 3 miles per hour to 20 miles per hour.

This time measuring means is controlled by the track relays of the track circuits through the two biased polar relays 1SU and 2SU, these relays being biased to a reverse position, that is, the right-hand position as viewed in the drawing, and operated to a normal or left-hand position when the relay is energized by direct current of the proper polarity from a source, the positive and negative terminals of which are indicated by the reference characters B and N. These relays 1SU and 2SU are operated alternately as the consecutive track sections 1S to 11S are occupied and the corresponding track relays are released one at a time as a car moves through this stretch. These relays 1SU and 2SU provide a direct control of the cycle repeater CP and function to provide a starting, operating and holding circuit for the relay chains of the units UC and MC. The relays are also cross connected to prevent any overlapping in their operation.

Specifically, when the leading pair of wheels of a car enter the section 1S and shunt the track relay 1T, a starting circuit is completed from terminal B through front contacts 69 to 78, inclusive, of the track relays 11T to 2T, respectively, back contact 79 of the track relay 1T, wire 80, winding of the relay 1SU, reverse contact 81 of the relay 2SU, reverse contacts 82 and 83 of control relays 1SPR and 2SPR, respectively, to be referred to later, and wire 84 to negative terminal N through contacts of the relays of the multiple cycle counter MC and the unit cycle counter UC in the manner shown in the aforementioned C. S. Snavely Patent No. 2,320,802. This starting circuit thus energizes the relay 1SU and the relay is operated to its normal or left-hand position closing contact 85 and completing a circuit by which alternating current is supplied to the cycle repeater CP. The repeater CP is set into operation to in turn supply current impulses to the counting chains UC and MC and operate the relays of the chains in the manner previously described. With the relay 1SU operated to the left-hand position closing its contact 86, an operating and holding circuit is completed for the units UC and MC, the operating circuit branching off from the previously described starting circuit and being completed through contact 86 of relay 1SU and wire 87, and the holding circuit branching off from the operating circuit through a resistor 88. With the relay 1SU thus operated, the time measuring means functions to determine the time consumed for the leading pair of wheels of the car in passing through the section 1S. The control set up by the time measuring means in response to this time period will be referred to hereinafter.

When the leading pair of car wheels enter the section 2S and shunt the track relay 2T, the opening of front contact 78 deenergizes the control relay 1SU and it is immediately restored to its reverse position and thereby opens the circuit by which energy is supplied to the cycle repeater and to the counting chains and they are reset. The closing of back contact 78 of track relay 2T completes a new starting circuit which includes relay 2SU and which circuit can be traced from terminal B through front contacts 69 to 77 of the track relays 11T to 3T, respectively, back contact 78 of relay 2T, wire 89, winding of relay 2SU, reverse contact 90 of relay 1SU and thence to the cycle counting units MC and UC as pointed out for the previous starting circuit. This causes relay 2SU to be operated to its normal or left-hand position to close contact 91 and again cause alternating current to be supplied to the cycle repeater CP and current impulses in turn to be applied to the counting chains. With the control relay 2SU operating to its normal position closing contact 92, the previously traced operating and holding circuits for the counting chain units are again completed. Thus the cycle counter units UC and MC are operated to measure the time consumed by the pair of car wheels in passing through the section 2S and thereby determine the speed of the car in this track section.

When the leading pair of car wheels enter the section 3S and shunt the track relay 3T to open front contact 77, current is removed from the relay 2SU and the relay 2SU and the relays of the counting chains of the time measuring means are at once reset. The closing of back contact 77 of the track relay 3T completes the first starting circuit for the relay 1SU and that relay is operated to its normal position to again start operation of the time measuring means. It is to be seen that a new operation of the time measuring means is initiated each time the leading pair of car wheels enter the successive track sections and thereby measures the car speed in each track section.

The apparatus includes a normal reset relay NR and an emergency reset relay ER by which the track relays are reset when the leading pair of car wheels leave the last section 11S and control of the time measuring means is passed to the next pair of car wheels in the rear and so on to each successive pair of car wheels until the entire car has completely passed out of the track sections. The normal reset relay NR is provided with a pickup and a stick circuit, the pickup circuit having two alternate paths. The first path extends from terminal B over back contact 94 of the track relay 11T, wire 95 and winding of the relay to terminal N of the current source. The second path of the pickup circuit extends from terminal B over front contact 96 of relay 6M of the counting chain MC, front contact 97 of relay ER and winding of relay NR to terminal N. The stick circuit for relay NR includes its own front contact 98 and front contact 99 of the emergency reset relay ER. The emergency reset relay ER is provided with a pickup circuit which extends from terminal B, through front contact 100 of the relay 6M of the counting chain MC, front contact 101 of relay 4U of the counting chain UC, and winding of the relay ER to terminal N. A stick circuit is also provided for the relay ER and this circuit includes front contact 102 of the relay ER and front contact 100 of relay 6M. Preferably, the pickup and release time of the emergency relay ER is governed by a network of resistors and capacitors connected across the relay winding as will be apparent by an inspection of the drawing.

It follows that when the relay 1SU is operated in response to the leading pair of car wheels entering the final section 11S and starting operation of the time measuring means, the reset relay NR is picked up due to the closing of back contact 94 of track relay 11T. With relay NR picked up closing front contact 65, the previously described pickup circuit for the track relays 1T to 10T is completed. Also, the opening of back contact 52 of relay NR opens the second branch path of the shunting circuit for the track circuits of the sections 1S to 10S, and since the first branch path of the shunting circuit is now open at reverse contact 47 of the relay 1SU, the track relays 1T to 10T are picked up whether or not any car wheels occupy the sections 10S to 1S. Then, when the leading pair of car wheels leave the section 11S and the control relay 1SU is reset closing its contact 47, the shunting circuit path for the track circuits is completed and the track relay of any section occupied by a following pair of wheels is shunted and all the track relays to the rear of the shunted track relay are released. It is to be seen, therefore, that the control of the track relays is passed from the leading pair of wheels to the next pair of wheels in the rear as the leading pair of wheels leave the section 11S and this action is repeated for the succeeding pairs of wheels of the car due to the operation of the reset relay NR.

To sum up, therefore, when no car is traversing this series of track sections each of the track relays is retained picked up due to its holding circuit. When a car traverses the sections the leading pair of wheels as it enters each track section shunts the corresponding track relay and that relay is released and all relays to the rear are retained released. When the leading pair of wheels leave the section 10S and enter the last section 11S the track relays to the rear are reset due to the reset relay NR being picked up to close its front contact 65 and due to the shunting circuit being open at back contact 52 of relay NR and reverse contact 47 of relay 1SU. The track relays are picked up in sequence and each is picked up only if the relays in the rear are picked up. Each pair of wheels of a car have the same control as the leading pair of wheels and the track relays are responsive to the car shunt until the car has passed completely out of the track sections. Furthermore, each track relay is provided with a suitable working current to assure it is retained energized under relatively low leakage resistance between the sections which may be caused by metal chips from the braking bars of the car retarder and from the car wheels when they are being braked, such metal chips tending to bridge the insulated joints. Also, a shunting sensitivity for each track relay is obtained such that each track relay is responsive to a relative high resistance car shunt obtained from a single pair of car wheels.

When a pair of wheels pass off the leaving sections 11S and the next pair of wheels to the rear take over control of the speed measuring means, this pair of wheels are very likely to be part way through the track section they then occupy, with the result the measured speed will be too high due to the shortened length of travel of the controlling pair of wheels. To prevent this false measurement of the speed, the apparatus includes a pair of even and odd cancellation relays EC and OC, respectively, the purpose of which is to cancel the first speed measurement after occupancy of the leaving track circuit. These cancellation relays also function to hold the retarder at its nonbraking or open position for stalled or very slow moving cars. Each of these cancellation relays is controlled through a pickup circuit and a stick circuit. The pickup circuit for the even cancellation relay EC extends from positive terminal B of the power source through front contact 103 of track relay 10T, wire 104, normal contacts 105 and 106 in multiple of the control relays 1SPR and 2SPR, respectively, front contact 107 of reset relay NR and winding of relay EC to terminal N. The stick circuit for this relay EC includes terminal B, back contacts 108, 109, 110, 111 and 112 of the even numbered track relays 10T, 8T, 6T, 4T and 2T, respectively, and a front contact of each of the track relays in advance of the released track relay in sequence, wire 113, front contact 114 and winding of the relay EC, and terminal N. Similarly, the pickup circuit of the odd cancellation relay OC is the same as that traced for the relay EC except that it includes front contact 115 of the relay NR. The stick circuit for the odd cancellation relay OC includes terminal B, back contacts 116, 117, 118, 119, 120 and 121 of the odd numbered track relays 11T, 9T, 7T, 5T, 3T and 1T, respectively, and a front contact for each track relay in advance of the odd numbered relay released, wire 122, front contact 123 and winding of the relay OC and terminal N. The specific manner in which these cancellation relays function will be described when the operation of the apparatus is described.

It has been explained previously that there are different correct speeds for the different car units to leave the retarder. It is also well known that it is desirable to vary the initial pressure of the retarder and the partial pressure to which the initial pressure is reduced as the car speed comes near the correct leaving speed according to the different leaving speeds desired. Also, it is desirable to set up a partial pressure release speed and a full release speed according to the desired leaving speed. It has been explained hereinbefore that the car retarder CR is provided with four different pressure conditions which are selectively established according to which of its control terminals positive energy is applied. Consequently, the time measuring means is connected to the car retarder control terminals through a speed pressure selective means for automatic control of the retarder, the automatic control being such that the car speed is decreased or allowed to increase as required in order for the car unit to leave the retarder at the desired leaving speed. To this end there is provided a speed pressure selective means including a series of leaving speed selectors and a speed pressure selective circuit network together with a group of control relays.

This speed pressure selective means is the subject of a copending application for Letters Patent of the United States, Serial No. 283,932, filed on the same day as the current application, by Edward J. Agnew, for Car Retarder Speed Pressure Selective Control Apparatus, now Patent No. 2,727,138, issued December 13, 1955, this Agnew application and the present application being of common ownership. This speed pressure selective means is not here claimed and it will be disclosed and described only as needed for a full understanding of the automatic control of the retarder by the speed determining and control apparatus of my invention. Reference is made to the above-mentioned Edward J. Agnew patent for a full description of the speed pressure selective means.

There are provided six leaving speed selectors here shown as six push buttons 1PB to 6PB, inclusive. These push buttons are mounted for convenient operation by the operator in charge of the retarder CR. These push buttons are alike and each is operable to a normal and a reverse position and provided with a normal and a reverse position contact. Each push button is assigned a leaving speed, such as, for example, 4, 5, 6, 7, 8 and 9 miles per hour for the push buttons 1PB, 2PB, 3PB, 4PB, 5PB and 6PB, respectively. This series of push buttons is provided with a series of repeater relays, one for each push button, the relays 1PR to 6PR being assigned to the push buttons 1PB to 6PB, respectively.

The circuit arrangement is such that each relay is energized in response to operation of the corresponding push buton. For example, the relay 1PR is energized by a simple circuit including the reverse position contact of the push button 1PB. Likewise, the circuit for each of the other relays includes the reverse position contact of the corresponding push button and the normal position contact of all the push buttons ahead as will be apparent by an inspection of Fig. 1a. Furthermore, the first relay 1PR is normally energized through a circuit including in series the normal contacts of all the push buttons and thus the lowest leaving speed of 4 miles per hour is normally selected. These repeater relays are used to set up controls in the speed pressure selective circuit network here indicated conventionally by a rectangle SP.

Since it is desirable to have the initial pressure of the retarder and the partial pressure to which the initial pressure is reduced as the car approaches the requested leaving speed vary with the requested leaving speed, a group of car retarder control relays 1PPR, 1SPR, 2PPR and 2SPR are jointly controlled by the speed measuring apparatus and the repeater relays 1PR to 6PR through a network set up within the speed pressure selective network SP. Power for energizing the relays 1PPR and 1SPR in series is applied at times to a terminal 150 of the network SP and thence is applied to the relays 1PPR and 1SPR in series through a current limiting resistor 155. Similarly, the two relays 2PPR and 2SPR in series are energized through a current limiting resistor 93 by current supplied to a terminal 151 of the network SP. For reasons to appear shortly, the control relays 1PPR and 1SPR are at times provided with energizing current through a stick circuit that is controlled by the cancellation relays EC and OC, the circuit including front contacts 124 and 125 in multiple of the cancellation relays EC and OC, respectively, reverse contact 128 of relay 2SPR, normal contact 129 of relay 1SPR, normal contact 130 of relay 1PPR, terminal 152 of the network SP and thence through the network by connection indicated conventionally by a dotted line 148 to the terminal 150 and then as previously traced through the windings of these two relays in series. Similarly, the two relays 2PPR and 2SPR are provided with a stick circuit by which they are at times energized, and which stick circuit also includes front contacts 124 and 125 of the cancellation relays EC and OC, normal contact 126 of relay 2SPR, normal contact 127 of relay 2PPR, terminal 153 of the network SP and through the network by a circuit connection indicated conventionally by dotted line 154 to terminal 151 and thence through the windings of the two relays in series. As explained in the afore-mentioned Agnew patent, the two relays 1PPR and 1SPR are retained in their biased reverse position until the car speed approaches a selected partial pressure release speed which is a little above the desired leaving speed and at which partial pressure release speed it is desirable to reduce the initial pressure applied to the retarder to a selected partial pressure, these relays then being operated to their normal or left-hand position. Also, the two relays 2PPR and 2SPR are retained at their biased reverse position until the car speed is reduced to a full release speed which is substantially the selected leaving speed and the relays are then operated to their normal position. This group of control relays govern the supply of positive energy to the terminals XP to 4PP of the retarder control through circuit connections within the speed pressure circuit network SP as determined by the operation of the push buttons and by the setting of the speed measuring means in response to the speed of a car moving through the various track sections. Specifically, energy from positive terminal B of the power source is applied through reverse contacts 131 and 132 of the relays 2PPR and 1PPR, respectively, to a terminal 133 within the circuit network SP. This terminal 133 is in turn connected through different selective circuits of the network to any one of the terminals 134 to 137, these selective circuits being indicated by dotted lines and would be in accordance with the selection provided in the Agnew patent. The terminals 134, 135, 136 and 137 are in turn connected to the retarder terminals 1PP, 2PP, 3PP and 4PP, respectively, by wires 143, 144, 145 and 146, respectively. Again, positive energy is applied from terminal B of the power source through reverse contact 131 of relay 2PPR and normal contact 132 of relay 1PPR to a terminal 141 within the circuit network SP, and which terminal 141 is connected to the terminals 134 and 137 by selective circuits within the network SP as indicated by dotted lines. Furthermore, positive energy is at times supplied from terminal B through normal contact 140 of relay 2PPR to a terminal 139 in the network SP, and which terminal 139 is in turn connected to terminal 138 by a selective circuit, the terminal 138 being in turn connected to terminal XP of the retarder control by wire 147.

In describing the operation of the apparatus, I shall assume that a leaving speed of 5 miles per hour is selected by operation of the push button 2PB to establish a desired leaving speed for a car unit approaching the car retarder CR, and the circuit network SP is set to apply 100 pounds' initial pressure to the car retarder, and a partial pressure of 50 pounds per square inch and a partial pressure release speed of 5.5 miles per hour. This selection provides that energy is applied initially to terminal 137 of the network SP and in turn to terminal 4PP of the retarder control causing a pressure of 100 pounds to be applied to the cylinders of the motor units of the retarder. When the leading pair of wheels of this car unit enter the section 1S to shunt track relay 1T, the speed measuring means is operated to measure the car speed in this section, as explained hereinbefore. Assuming that the speed of the car unit is well above 5.5 miles per hour no change is made in the control of the retarder and it continues to exert a braking force derived from the 100 pound pressure. When the leading pair of car wheels enters the section 2S and shunts the track relay 2T, the speed measuring means is reset and a new measure of the speed is made while the leading pair of wheels is moving through the section 2S. Assuming that the car speed is still above 5.5 miles per hour, no change is made in the braking force applied to the retarder. Assuming next that the car speed is reduced to approximately 5.5 miles per hour in the section 6S, the speed measuring means indicates this partial pressure release speed of 5.5 miles per hour for section 6S and the network is controlled in such a manner that energy is applied to the relays 1PPR and 1SPR and these relays are energized so that the normal contact 132 of the relay 1PPR is closed and energy is applied to terminal 141 of the network SP. The network SP is now so completed as to apply energy from the terminal 141 to terminal 135 and energy is in turn applied to terminal 2PP of the car retarder control and the retarder is controlled through the tube 2P and the pressure applied to the cylinders of the car retarder is reduced to the selected partial pressure of 50 pounds per square inch.

I shall now assume that this braking force is sufficient to reduce the speed of this car unit to the selected leaving speed of 5 miles per hour in section 10S. When the speed measuring means indicates a speed of 5 miles per hour in section 10S, the network SP is so controlled as to cause relays 2PPR and 2SPR to be operated closing the normal contact 140 of the relay 2PPR. This causes positive energy to be applied to terminal 139 of the network, and which terminal at this time is connected to terminal 138 and hence to the terminal XP of the retarder control, with the result the retarder is released and the car moves forward without any braking force on the part of the car retarder. When the leading pair of wheels of the car unit leave the section 11S the time measuring means is reset and also the track relays are reset as previously explained.

On the assumption that the next pair of car wheels in the rear occupy the section 9S as the leading pair of wheels leave the section 11S, the track relay 9T and all the track relays to the rear are released due to the shunting of the section 9S. Since, at the time the reset relay NR is picked up to close front contact 115, the pickup circuit for the odd cancellation relay OC is completed because track relay 10T is now picked up to close its front contact 103 and relay 2SPR is operated to its normal position closing normal contact 106. Then, with relay OC once picked up it is retained energized by its stick circuit completed through back contact 117 of the now shunted track relay 9T. With the cancellation relay OC picked up closing front contact 125, energy is applied over the stick circuit to the relays 2PPR and 2SPR and these relays are retained in their normal position with the result the car retarder is held open notwithstanding any selection made by the time measuring means which would tend to control the relays 2PPR and 2SPR. That is to say, no change in the position of the control relays 2PPR and 2SPR can be effected through the time measuring means due to this pair of car wheels shunting the track relay 9T and the time measuring means operating only during the portion of the travel of the pair of wheels in the section 9S. Obviously, the speed measuring means would indicate a speed in section 9S which is higher than the true speed of a car unit due to only a portion of section 9S being traveled by this second pair of car wheels while the speed measuring means is operated. If the cancellation of the action of the speed measuring means on the relays 2PPR and 2SPR is not effected, these relays might be operated back to their reverse position due to the indication of the higher speed. This would cause power to be applied to the control terminal 2PP of the car retarder and a braking pressure applied to the car retarder while the car is already moving at the selected leaving speed.

When this second pair of car wheels enter the section 10S and shunt track relay 10T, opening front contact 149 of that relay, the stick circuit for the cancellation relay OC is open and the relay OC is released so that the control of the relays 2PPR and 2SPR effected by the stick circuit through front contact 125 of relay OC is cancelled and the time measuring means again controls these relays according to the speed determined for the car moving through the sections 10S and 11S.

In the event this second pair of car wheels occupy the section 8S, then the cancellation relay EC would be energized and completes at its front contact 124 the stick circuit for the relays 2PPR and 2SPR and thereby cancels any control effected by the time measuring means during the period this second pair of wheels pass through a portion of the section 8S. It is clear that when this second pair of car wheels leave the section 11S the control of the time measuring means and in turn of the car retarder is passed to the next pair of wheels in the rear and this control repeated for each successive pair of wheels until the last pair of wheels of the car unit leave the section 11S.

It is to be noted that this cancellation action effected through the relays OC and EC is carried out only if the leaving section 11S is first occupied and the reset relay NR picked up closing its front contacts 115 and 107. Also, the two relays EC and OC determine which track sections in the rear are occupied, that is, if the nearest occupied section to the leaving section is an odd or an even section. When the next section in advance is entered by this pair of wheels to shunt the track relay, the control of the cancellation relays is removed and the control of the speed measuring means restored.

It will next be assumed that when the leading pair of wheels of this car unit occupy the section 6S, the so-called squeezing action of the retarder lifts the wheels of the car off the track rails. With the car wheels riding on the braking bars of the car retarder, the track relay for the next section 7S is not shunted and the timing means is not reset so that the timing means continues its operation and shortly approaches the full limit of its operation causing the relays 6M and 4U to be picked up. Under this circumstance, the emergency reset relay ER is picked up due to its pickup circuit being completed at front contact 100 of relay 6M and front contact 101 of relay 4U, and the relay ER is then retained energized by the stick circuit including front contact 100 of relay 6M. With the emergency reset relay ER picked up closing front contact 97, the alternate pickup circuit for the normal reset relay NR through front contact 96 of relay 6M is closed and relay NR is picked up and by so doing closes its front contact 65 which causes the track relays to be reset.

When the time measuring means operates to its limit, then the control relays 2PPR and 2SPR are energized and operated to their normal position because full operation of the time measuring means indicates a speed less than the selected leaving speed of 5 miles per hour. With the relay 2PPR operated to its normal position opening contact 131 and closing contact 140, positive energy is applied to terminal 139 of the network SP and in turn energy is applied to terminal XP of the retarder control causing the retarder to be operated to its nonbraking or open position. This operation of the retarder allows the car wheels to drop back onto the track rails and again shunt the track sections. When the track relay resets due to the operation of the emergency and normal reset relays ER and NR, the time measuring means is also reset causing the relay 6M to be released and its release in turn opens the energizing circuit for the reset relays ER and NR and they are deenergized and released.

It is to be observed that the cancellation relays OC and EC are also energized and picked up in response to operation of the reset relay NR and the two control relays 2PPR and 2SPR are held at the normal position but that the cancellation relays are released subsequent to the release of relay NR. Hence the control relays 2PPR and 2SPR are deenergized and restored to their biased reverse position causing energy to be reapplied to the retarder control terminal 2PP so that the pressure on the retarder is again reestablished and the control of the braking force of the retarder and of the car unit regained. Due to a lag in operation of the retarder, it may not have entirely released or moved to its open position during the above sequence of action of the relays following the squeezing action that lifted the car wheels off the rails and to insure that there is sufficient time for the retarder to entirely open, the emergency reset relay ER is provided with its variable resistor-capacitor circuit across its winding so that the release time of this relay can be adjusted to assure a complete retarder release.

If for any reason the car unit is traveling very slowly or is stalled in the retarder, the retarder is opened so that the car unit may pick up speed and leave the retarder at near the correct or selected leaving speed. Assuming the car unit is stopped or moving very slowly with its leading pair of wheels in the section 6S, all the entrance end track relays up to and including relay 6T are released and all the leaving end track relays 7T to 11T are picked up. This permits the time measuring means to operate to its limit so that the relay 6M is picked up. Also, the control relays 2PPR and 2SPR will be energized through the network because the measured speed is less than the selected leaving speed of 5 miles per hour. The reset relays ER and NR are now energized in sequence and in turn the cancellation relays OC and EC are picked up, the latter relays providing energy for holding the relays 2PPR and 2SPR energized. This causes energy to be applied to terminal 139 of the network and in turn to terminal XP of the retarder and the pressure in the retarder is exhausted and the retarder is operated to its open or nonbraking position. Furthermore, the time measuring means is reset causing relay 6M to be released with the result the reset relays ER and NR are deenergized and released. With the retarder released, the car unit will start moving due to gravity. The cancellation relay EC will be retained energized until the leading pair of wheels enter the section 7S and shunt the track relay 7T, the release of relay 7T opening the stick circuit for relay EC so that that relay is now deenergized. This permits the time measuring means to start anew. If the speed of the car is still too low in section 7S, the relay 2PPR is again energized through the selective network and positive energy is applied to the retarder terminal XP so that the retarder is held open. It is to be pointed out that the release period of relay 2PPR is sufficient to bridge the period from the release of the cancellation relay EC to open the stick circuit for the relay 2PPR and the operation of the time measuring means to reestablish the energizing circuit for the relay 2PPR through the selective network SP.

It is apparent from the foregoing discussion that the timing action will be repeated over and over again and the retarder held open as long as the car unit moved slowly but that the retarder will be operated to reapply the braking force if the car unit picks up speed to exceed the selected leaving speed of 5 miles per hour.

In view of the foregoing description of the operation of the apparatus for a leaving speed of 5 miles per hour, it is apparent that the apparatus will operate in substantially the same manner for any other selected leaving speed between 4 and 9 miles per hour and for any selected initial pressure and partial pressure of the retarder selected within the limits of the apparatus.

Although I have herein shown and described but one form of railway car speed determining and control apparatus embodying my invention, it is understood that various changes and modifications may be made therein within the scope of the appended claims without departing from the spirit and scope of my invention.

Having thus described my invention, what I claim is:

1. In apparatus for repeatedly measuring the speed of a railway car by a time measuring means having an initial position to which it is biased and an extreme position toward which it is operated from the initial position when supplied with current, the combination comprising, a series of consecutive track sections which are numbered in an ascending order for a given direction of traffic, said sections of substantially the same length, a series of normally energized track relays one for each said section, each said relay having a holding circuit and a shunting circuit, the holding circuit for each said track relay including a current source, a front contact of each of the other track relays in advance and a front contact and a winding of the relay; the shunting circuit for each said track relay including a connection from one terminal of the source of the corresponding holding circuit to one rail of the corresponding section and another connection from the other rail of the corresponding section to the holding circuit at the terminal of the relay winding toward the other terminal of the corresponding source, a first and a second circuit means each having connections to a given current source for supplying current therefrom, and said first circuit means including in multiple a back contact of each of the track relays of odd numbered sections of said series and said second circuit means including in multiple a back contact of each of the track relays of even numbered sections of said series.

2. In apparatus for repeatedly measuring the speed of a railway car having a plurality of spaced pairs of wheels while the car travels a given stretch of track by a time measuring means having an initial position to which it is biased and an extreme position toward which it is operated when supplied with current, and for continuing the measuring function until the last pair of car wheels leave the stretch, the combination comprising, a stretch of track formed with a series of track sections which are normally traveled in a given direction, a series of normally energized track relays one for each said section, said relays being numbered in an ascending order for the given direction of travel, each said relay having a holding and a shunting circuit; the holding circuit for each said relay except the last relay including a first current source, a front contact and a winding of the relay and a front contact of each of the other relays in turn except the last relay in their descending order, the holding circuit for the last relay including a second current source and a winding of that relay; the shunting circuit for each said relay including a connection from one terminal of the source of the corresponding holding circuit to one rail of the corresponding section and another connection from the other rail of the corresponding section to the holding circuit at the terminal of the winding of the relay toward the other terminal of the corresponding source, a first and a second circuit means each having connections to another current source for at times supplying current therefrom, said first circuit means including in multiple a back contact of each of the odd numbered track relays and said second circuit means including in multiple a back contact of each of the even numbered track relays, a reset relay; a reset circuit for each said track relay except the last relay including said first current source, a front contact of the reset relay, a winding of the track relay and a front contact of each of the other track relays in turn in their ascending order up to the relay, means including a back contact of said last track relay to energize said reset relay, and means including contacts governed by said first and second circuit means to open at times said shunting circuits for all said track relays except the last relay.

3. In apparatus for repeatedly measuring the speed of a railway car by a time measuring means having an initial position to which it is biased and an extreme position toward which it is operated when supplied with current, the combination comprising, a stretch of railway track having one rail formed with a series of consecutive track sections which are normally traveled in a given direction, a series of normally energized track relays one for each said section, said relays numbered in an ascending order for said given direction, each said track relay having a holding and a shunting circuit; the holding circuit for each relay except that for the last relay including in series a selected terminal of a current source, a front contact of each of the other relays in turn in their descending order up to the relay, a front contact and a winding of the relay and the nonselected terminal of said source; a holding circuit for the last track relay including a selected terminal of a current source, a winding of that relay and the nonselected terminal of that source; the shunting circuit for each said relay including a connection from the selected terminal of the corresponding source to the noninsulated rail of the stretch and an individual connection from the insulated rail of the corresponding section to the corresponding holding circuit at the terminal of the relay winding adjacent the nonselected terminal of the corresponding source, a first and a second control relay, means including in multiple a back contact of each of the odd numbered relays of the track relay series connected to the first control relay to energize that relay, means including in multiple a back contact of each of the even numbered relays of said track relay series connected to the second control relay to energize that relay, and a current supply circuit including in multiple a contact of each of said control relays closed when the respective control relay is energized.

4. In apparatus for repeatedly measuring the speed of a railway car having a plurality of spaced pairs of wheels while the car travels a given stretch of track by a time measuring means having an initial position to which it is biased and an extreme position toward which it is operated when supplied with current and for continuing the measuring function until the last pair of car wheels leave the stretch, the combination comprising, a stretch of track formed with a series of track sections which are numbered in an ascending order for a given direction of travel, said sections being of substantially the same length and of such a length that only one pair of car wheels occupy a section at a time, a series of normally energized track relays one for each section, each said track relay having a holding and a shunting circuit, the holding circuit for each said relay except that for the relay of the last section of the series including a first current source, a front contact of each of the other track relays in advance except the last section relay in turn and a front contact and a winding of the relay, the holding circuit for the last section track relay including a second current source and a winding of that relay, the shunting circuit for each said relay including a connection from one terminal of the source of the corresponding holding circuit to one rail of the corresponding section and another connection from the other rail of the corresponding section to its holding circuit at the terminal of the relay winding toward the other terminal of the corresponding source, a first and a second control relay each of which is operable from a reverse position to a normal position when energized, means including in multiple a back contact of each of the track relays of the odd numbered sections connected to said first relay to energize that relay, other means including in multiple a back contact of the track relays of the even numbered sections connected to said second relay to energize that relay, a current supply circuit including in multiple a normal contact of each of said control relays, a reset relay; a reset circuit for said track relays except that for the last section including said first current source, a front contact of said reset relay, a front contact of each of the other track relays in the rear in turn and a winding of the relay; a circuit including a back contact of the last section track relay to energize said reset relay, and a reverse position contact of each said control relay interposed in said shunting circuit except for the last section relay to open these shunting circuits when either control relay is energized.

5. In apparatus for repeatedly measuring the speed of a railway care having a plurality of spaced pairs of wheels while the car travels a stretch of track by a time measuring means having an initial position to which it is biased and an extreme position toward which it is operated when supplied with current and for continuing the measuring function unitl the last pair of car wheels leave the stretch, the combination comprising, a series of consecutive track sections which are normally traveled in a given direction, said sections of the same length and each of such a length that only one pair of wheels occupy a section at a time, a series of normally energized track relays one for each said section, said relays numbered in an ascending order for said given direction, a holding circuit and a shunting circuit for each said track relay; each holding circuit except that for the last relay of the series including in series one terminal of a first current source, a front contact of each of the track relays in advance except the last relay in turn, a front contact and a winding of the relay and the other terminal of the source; the holding circuit for the last relay of the series including one terminal of a second current source, a winding of that relay and the other terminal of said another source; each said shunting circuit except that for the last relay having two paths a first one of which extends from said one terminal of the first source through a reverse contact of each of a first and a second control relay, one rail of the corresponding section and a connection from the other rail of the corresponding section to the terminal of the relay winding toward the other terminal of said first source; a second path of each of said shunting circuits extending from said one terminal of said first source through a back contact of a reset relay, a back contact of each of the track relays except the last relay in multiple, said one rail of each section and thence as the first path; the shunting circuit for the last track relay of the series including a connection from said one terminal of said second source to one rail of the last section and a connection from the other rail of the last section to the terminal of the winding of that relay toward the other terminal of the second source, means including in multiple a back contact of each of the odd numbered track relays connected to said first control relay to operate the relay to its normal position, means including in multiple a back contact of each of the even numbered track relays connected to said second control relay to operate that relay to its normal position, means including a back contact of the last track relay of the series to energize said reset relay, a reset circuit for each track relay except the last relay including a front contact of the reset relay and a front contact of each track relay in the rear in turn, and a supply circuit including in multiple a normal contact of each of said control relays.

6. In apparatus for measuring the speed of a railway car by a time measuring means having an initial position and an extreme position toward which it is operated at a given rate when supplied with current, the combination comprising, a stretch of track formed with an insulated track section, a normally energized track relay for the section, said relay having a holding circuit and a shunting circuit; said holding circuit including in series a selected terminal of a current source, a front contact and a winding of the relay and the nonselected terminal of the source; said shunting circuit including a connection from the selected terminal of said source to one rail of said section and another connection from the other rail of the section to the terminal of the relay winding adjacent said nonselected terminal of the source, and a current supply circuit means for said time measuring means including a back contact of said track relay.

7. In apparatus for measuring the speed of a railway car by a time measuring means having an initial position and an extreme position toward which it is operated at a given rate when supplied with current, the combination comprising, a stretch of track formed with a first and a second track section which are normally traveled in the order named, said first section being of a selected length, a normally energized track relay for each of said sections, each said relay having a holding circuit and a shunting circuit, the holding circuit for the first section relay including a selected terminal of a current source, a front contact and a winding of the relay and the other terminal of the source, the holding circuit of the second section relay including a selected terminal of a current source, a winding of that relay and the other terminal of that source, the shunting circuit of each relay including a connection between said selected terminal of the corresponding source and one rail of the corresponding section and another connection from the other rail of the corresponding section to the terminal of the relay winding adjacent the other terminal of the corresponding source, a control relay having a reverse position and operable to a normal position when energized, means including a back contact of the first section track relay connected to said control relay to energize the control relay, a current supply circuit including a normal contact of said control relay, a reset circuit for said first section track relay including the first mentioned current source, a front contact of a reset relay and the winding of that track relay, means including a back contact of the second section track relay to energize said reset relay, and a reverse contact of said control relay interposed in said shunting circuit of the first section track relay.

8. In combination, a stretch of railway track provided with a car retarder having a braking and a nonbraking position, a series of consecutive relatively short track sections formed in said stretch, a series of track circuits one for each said section, each said track circuit including a normally energized track relay which is operated to a first or a second position according as the track rails of the corresponding section are not or are shunted, a control relay biased to a reverse position and operated to a normal position when energized, control means including contacts of said control relay having connection to said car retarder to control the retarder to its braking or nonbraking position according as the control relay is reverse or normal, a cancellation relay, cancellation means including a contact of said cancellation relay having connection to said control relay to energize the control relay when the cancellation relay is energized, and circuit means including contacts of said track relays to energize the cancellation relay when the rails of any one of said sections have been shunted and the shunt lost due to a squeezing action of the retarder.

9. In combination, a stretch of railway track provided with a car retarder having a braking and a nonbraking position, a series of consecutive relatively short insulated track sections formed in said stretch, a series of track circuits one for each said section, each said track circuit including a track relay which is normally energized by a stick circuit and is connected to the rails of the section by a shunting circuit to release the relay when the rails of the section are shunted, a reset relay, means including a front contact of said reset relay having connection to said track relays to pick up each track relay, means including a contact controlled by a selected one of said track relays to at times energize said reset relay, a control relay having a normal and a reverse position, control means including a contact of said control relay having connection to said car retarder to control the retarder to its braking or nonbraking position according as said control relay is reverse or normal, a cancellation relay, means including a front contact of said reset relay and a contact of said control relay to energize said cancellation relay, and circuit means including a front contact of said cancellation relay connected to said control relay to control it to its normal position and thereby control the car retarder to its nonbraking position.

10. In control apparatus for car retarders, the combination comprising, a stretch of railway track provided with a car retarder through which cars move in a given direction and having a braking and a nonbraking position, a series of consecutive relatively short insulated track sections formed in said stretch of track, a series of track circuits one for each of said sections, each said track circuit including a track relay which is normally picked up and is released when the track rails of the section are shunted, a time measuring means having an initial and an extreme operated position, means including contacts of each track relay connected to the time measuring means to initiate a new operation of said time measuring means as said sections are successively shunted, a control relay having connections to said retarder to control the retarder to its braking and nonbraking positions according as the control relay is controlled to a reverse or a normal position, a first circuit means including contacts operated according to the extent said time measuring means is operated connected to the control relay for controlling at times that relay to its normal position, a reset relay, means including a contact of said time measuring means closed at substantially said extreme position to energize the reset relay, circuit means including a front contact of said reset relay to pick up said track relays irrespective of occupancy of said sections, a cancellation relay having an energizing circuit including a front contact of said reset relay and a contact controlled by said time measuring means, and a second circuit means including a front contact of said cancellation relay having connection to said control relay to control that relay to its normal position and the retarder to its nonbraking position.

11. In apparatus for repeatedly measuring the speed of a railway car, a stretch of railway track formed with a series of consecutive relatively short insulated track sections which are normally traveled in a given direction, each said section of a length such that it is occupied by only one pair of railway car wheels at a time, a series of normally energized track relays one for each of said sections, said relays being numbered in an ascending order for said given direction, each said relays having a holding circuit which includes its own front contact and a first shunting circuit which includes connections to the track rails of the corresponing section to release the relay when the rails of the section are shunted, a reset relay, a second shunting circuit for each track relay including a back contact of the reset relay and a back contact in multiple of each of said series of track relays to connect each track relay to the rails of its section, each said track relay having a reset circuit including a front contact of said reset relay to pick up the relay subsequent to its being shunted, a normal circuit connected to said reset relay to energize at times the reset relay, a time measuring means having an initial position to which it is biased and an extreme position to which it is operated when supplied with current, a first and a second time measuring control relay each biased to a reversed position and operated to a normal position when energized, means including in multiple a back contact of each of the odd numbered track relays of said series to energize said first control relay, means including in multiple a back contact of each of the even numbered track relays of said series to energize said second control relay, a retarder control relay biased to a reverse position and having connection to said time measuring means to at times operate the relay to a normal position, an odd and an even cancellation relay, a pickup circuit for each said cancellation relay including a front contact of said reset relay and a normal position contact of said retarder control relay, a stick circuit of said odd cancellation relay including a back contact of each odd numbered track relay, a stick circuit for said even cancellation relay including a back contact of each of said even numbered track relays, and means including in multiple a front contact of each said cancellation relay to at times retain said retarder control relay in its normal position.

12. In combination, a stretch of railway track, an insulated track section formed in said stretch, a track circuit means for said section comprising a holding circuit and a shunting circuit; said holding circuit including in series a selected terminal of a source of current, a front contact and a winding of a track relay, a resistor and the nonselected terminal of the source; and said shunting circuit including a connection between said selected terminal of said source and one rail of said section and another connection between the other rail of said section and the resistor terminal adjacent said relay winding in said holding circuit whereby said track relay is normally energized and is shunted when the rails of said section are shunted.

13. In combination, a stretch of railway track formed with an insulated track section, a normally energized track relay for said section to detect occupancy of the section; said relay having a holding circuit, a shunting circuit and a reset circuit; said holding circuit including in series a selected terminal of a source of current, a front contact and a winding of the relay, a resistor and the nonselected terminal of said source; said shunting circuit including a connection from said selected terminal of said source to one rail of the section and another connection from the other rail of the section to the resistor terminal adjacent said relay winding in said holding circuit; said reset circuit including in series said selected terminal of the source, a normally open reset contact when closed, said winding of the relay, said resistor and the nonselected terminal of said source; and means to close at times said reset contact.

14. In combination, a stretch of railway track having one rail formed with a first and a second insulated section, a normally energized track relay for said first section; said track relay having a holding circuit, a shunting circuit and a reset circuit; said holding circuit including in series a selected terminal of a source of current, a front contact and a winding of the relay and the nonselected terminal of the source; said shunting circuit including a connection between the selected terminal of said source and the noninsulated rail of the stretch and another connection between the insulated rail of said first section and said holding circuit at the terminal of said relay winding toward said nonselected terminal of the source; said reset circuit including in series said selected terminal of the source, a normally open reset contact, said winding of the relay and said nonselected terminal of the source; and means including a track relay responsive to traffic in said second section to close at times said reset contact.

15. In combination, a series of consecutive insulated railway track sections which are numbered in an ascending order for a given direction of traffic through the sections, a series of track relays one for each of said sections and correspondingly numbered, a source of current, a holding circuit for energizing the track relays, said holding circuit including a selected terminal of said source and a front contact of all the track relays in turn in the descending order of the numbering with a branch path for each relay from its own front contact through a winding of that relay to the nonselected terminal of said source, a shunting circuit for shunting each said track relay when the corresponding section is occupied, said shunting circuit including a common connection between said selected terminal of the source and one rail of each of the sections and an individual connection for each relay between the other rail of the corresponding section and the terminal of the winding of that relay toward said nonselected terminal of said source, a normally deenergized reset relay, a reset circuit for reenergizing said track relays, said reset circuit including said selected terminal of said source, a front contact of said reset relay, and a front contact of said track relays in turn in the ascending order of the numbering with a branch path for each relay from its front contact through the winding of that track relay to said nonselected terminal of said source, and means to energize at times said reset relay.

16. In combination, a stretch of railway track over which traffic normally moves in a given direction having one rail formed with a series of consecutive insulated track sections and its other rail electrically continuous and common to all of said sections, said sections being numbered in the order traveled by traffic moving in said given direction; a series of track relays one for each of said sections, said track relays being numbered according to the numbering of the sections, a holding circuit for energizing the relays of the series except the last relay; said holding circuit including a selected terminal of a first current source, a front contact of all the relays except the last relay in turn in the descending order with a branch path for each relay from its own front contact through a winding of that relay to the nonselected terminal of that source; a holding circuit for said last relay including a selected terminal of another current source, a winding of that relay and the nonselected terminal of said another current source, a series of shunting circuits one for each of said track relays, each said shunting circuit including a first connection from the selected terminal of the corresponding current source to said common rail and a second connection between the rail of the corresponding insulated section and the terminal of the relay winding toward the nonselected terminal of the corresponding source, a reset relay, a reset circuit for the relays of the series except the last relay; said reset circuit including the selected terminal of said first current source, a front contact of said reset relay, a front contact of the track relays in turn except the last relay in the ascending order with a branched path for each relay from its own front contact through the winding of the track relay to the nonselected terminal of said first current source, and means including a back contact of said last track relay to energize said reset relay.

17. Means for measuring the speed of a railway car traversing a stretch of railway track, comprising in combination, a series of relatively short track sections formed in said stretch, a series of track relays one for each of said sections, said track relays being numbered in an ascending order for a given direction of traffic through the sections, a holding circuit for normally energizing said track relays, said holding circuit including a selected terminal of a current source and a front contact of each said track relay in sequence in the descending order of their numbering with a branch path for each track relay branching from the original holding circuit to include a winding of that relay and the nonselected terminal of said source, a shunting circuit for shunting each said track relay when the corresponding section is occupied, said shunting circuit including a common connection between said selected terminal of said source and one rail of each of said sections and an individual connection for each relay between the other rail of the corresponding section and the terminal of the winding of that relay toward said nonselected terminal of said source, a time measuring means having an initial position to which it is biased and an extreme position toward which it is progressively operated at a given rate when supplied with current, a first means including in multiple back contacts of the odd numbered track relays of said series to supply current to the time measuring means, and other means including in multiple back contact of the even numbered track relays of the series to supply current to the time measuring means whereby a new operation of the time measuring means is initiated for each said section.

18. Means for measuring the speed of a railway car traversing a stretch of railway track, comprising in combination, a series of relatively short track sections formed in said stretch, a series of track relays one for each of said sections, said track relays being numbered in an ascending order for a given direction of traffic through the sections, a holding circuit for normally energizing said track relays, said holding circuit including a selected terminal of a current source and a front contact of each said track relay in sequence in the descending order of their numbering with a branch path for each track relay branching from the original holding circuit to include a winding of that relay and the nonselected terminal of said source, a shunting circuit for shunting each said track relay when the corresponding section is occupied, said shunting circuit including a common connection between said selected terminal of said source and one rail of each of said sections and an individual connection for each relay between the other rail of the corresponding section and the terminal of the winding of that relay toward said nonselected terminal of said source, a time measuring means having an initial position to which it is biased and an extreme position toward which it is progressively operated at a given rate when supplied with current, a first and a second control relay, said control relays being normally deenergized, means including in multiple a back contact of each of the odd numbered track relays of said series and a contact closed when said second control relay is deenergized to energize said first control relay, means including in multiple a back contact of each of the even numbered track relays of the series and a contact closed when said first control relay is deenergized to energize said second control relay, and means connected to the time measuring means and including in multiple a contact of each of said control relays closed when the control relay is energized to supply current to said time measuring means.

19. Apparatus for repeatedly measuring the speed of a railway car traversing a stretch of track in a given direction comprising, a series of insulated track sections formed in said stretch, said sections being numbered in an ascending order for said given direction, said sections being of substantially the same length and being of such length that but one pair of car wheels occupy a section at a time, a series of normally energized track relays one for each of said sections, each said track relay having a holding circuit and a shunting circuit; the holding circuit for each relay except the relay for the last section including in series a first current source, a winding of the relay and a front contact of each relay in advance except said last section relay; the holding circuit for said last section relay including a second source of current and a winding of that relay, the shunting circuit for each relay except the last section relay including a connection from one terminal of the first source to one rail of each section except the last and another connection from the other rail of the corresponding section to the terminal of the winding of the relay toward the other terminal of said first source, the shunting circuit of the last section relay including a connection from one terminal of the second source to one rail of the last section and a second connection from the other rail of that section to the terminal of the winding of the relay toward the other terminal of the second source, a time measuring means having an initial position to which it is biased and an extreme position toward which it is operated when supplied with current, a first means including in multiple a back contact of each of the track relays of the odd numbered sections of said series connected to the time measuring means to supply current to the time measuring means, a second means including in multiple a back contact of each of the track relays of the even numbered sections of said series connected to the time measuring means to supply current to the time measuring means, a reset circuit for each said track relay except the last section relay including said first source, a winding of the relay, a front contact of each track relay in the rear in turn and a front contact of a normal reset relay, a normal circuit including a back contact of the last section relay connected to said reset relay to energize the reset relay, and an emergency circuit including a contact closed just prior to said time measuring means being operated to its extreme position connected to the reset relay to energize that relay.

References Cited in the file of this patent

UNITED STATES PATENTS

| | | |
|---|---|---|
| 2,064,420 | Dodd | Dec. 15, 1936 |
| 2,178,287 | Pflasterer | Oct. 31, 1939 |
| 2,320,802 | Snavely | June 1, 1943 |
| 2,361,466 | Fitzsimmons | Oct. 31, 1944 |